US009591341B2

(12) United States Patent
Shintani

(10) Patent No.: US 9,591,341 B2
(45) Date of Patent: Mar. 7, 2017

(54) CONSTRAINING AVAILABILITY OF REAL TIME AND NON-REAL TIME CONTENT TO LOCALITY OF ASSOCIATED REAL TIME BROADCAST

(75) Inventor: Peter Shintani, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/540,096

(22) Filed: Jul. 2, 2012

(65) Prior Publication Data

US 2014/0007161 A1 Jan. 2, 2014

(51) Int. Cl.

*H04N 21/258* (2011.01)
*H04N 21/2668* (2011.01)
*H04N 21/81* (2011.01)
*H04N 13/00* (2006.01)

(52) U.S. Cl.

CPC ... *H04N 21/25841* (2013.01); *H04N 21/2668* (2013.01); *H04N 21/816* (2013.01); *H04N 13/0059* (2013.01)

(58) Field of Classification Search

CPC ........... H04N 21/258; H04N 21/25883; H04N 21/2668

See application file for complete search history.

(56) References Cited

U.S. PATENT DOCUMENTS 5,430,474 A * 7/1995 Hines .............................. 348/42
2003/0149618 A1* 8/2003 Sender .................. G06Q 30/02 705/14.55
2004/0088540 A1 5/2004 Marturano et al.
2004/0268417 A1* 12/2004 Gray et al. .................... 725/135
2005/0086697 A1 4/2005 Haseltine
2008/0046919 A1* 2/2008 Carmi et al. .................... 725/32
2008/0276267 A1* 11/2008 Badt et al. ...................... 725/32
2009/0193457 A1* 7/2009 Conn .............................. 725/34
2009/0228876 A1* 9/2009 Chen et al. .................. 717/168
2010/0185746 A1* 7/2010 Suh et al. ..................... 709/217
2011/0072450 A1* 3/2011 Kokernak et al. .............. 725/23
2011/0102544 A1* 5/2011 Kim ............................... 348/43

OTHER PUBLICATIONS

Advanced Television Systems Committee, "ATSC Candidate Standard: Non-Real-Time Content Delivery", Doc. TSG-876r1. Dec. 2, 2010.

* cited by examiner

*Primary Examiner* — Nasser Goodarzi
*Assistant Examiner* — Adil Ocak
(74) *Attorney, Agent, or Firm* — John L. Rogitz

(57) ABSTRACT

A source of television programming sends the TV programming into a geographic region. The source also sends enhanced programming for transmission. The enhanced signals result in transforming 2D video in the TV programming signals into 3D signals and/or replacing 2D video in the TV programming signals with 3D video. The enhanced programming is tied to the TV programming signals to limit useful display of the enhanced programming to the geographic region.

18 Claims, 2 Drawing Sheets

68 RECEIVE REGULAR BROADCAST PROGRAM & DISPLAY; RECEIVE TOKEN(S)
70 PRESENT ONSCREEN PROMPT(S) ACCORDING TO TOKEN(S)
72 RECEIVE USER RESPONSE TO PROMPT(S)
74 SEND RESPONSE(S) TO HEADEND BY DECODING TOKEN(S)
76 RECEIVE BACK NRT CONTENT & COMBINE WITH OR PRESENT IN LIEU OF BROADCAST

TV LOGIC

*FIG. 1* SYSTEM

HEADEND LOGIC

TV LOGIC

CONSTRAINING AVAILABILITY OF REAL TIME AND NON-REAL TIME CONTENT TO LOCALITY OF ASSOCIATED REAL TIME BROADCAST

I. FIELD OF THE INVENTION

The present application relates generally to constraining the availability of real time and non-real time (NRT) content to the geographic locality of the broadcast TV signals that are associated with the RT content.

II. BACKGROUND OF THE INVENTION

Modern communications has made possible augmenting TV presentations in a myriad of ways. Of particular interest to present principles is the possibility of real time and non-real time (NRT) content that can accompany broadcast TV programming, so-called not so much because it is not in real time but because it is not necessarily tied to a published schedule like the broadcast TV programming is, instead being capable of being selectively sent in parallel with the broadcast TV programming according to the discretion of the signal provider. Examples of such real time and NRT content include three dimensional (3D) content stream versions of broadcast two dimensional programming, or an alternate view of the broadcast two dimensional programming which when combined with the broadcast two dimensional programming results in a 3D rendering of the content.

As understood herein, such real time and NRT content may be receivable beyond the normal service area of a broadcaster because they may be sent on a different channel than is the broadcast two dimensional programming. For example, the NRT content may be sent to the TV over an Internet link, to be combined with or to replace broadcast two dimensional programming received over a terrestrial antenna or some other communication path, e.g., cable. As also understood herein, it typically may be desired that NRT reception be constrained to that of the service area of the terrestrial broadcaster.

SUMMARY OF THE INVENTION

An audio video display device (AVDD) includes a processor and a video display presenting demanded images under control of the processor. Computer readable storage medium bearing instructions are executable by the processor to receive a real time broadcast program such as a TV broadcast or Internet broadcast in a channel such as a TV channel or an Internet channel, and receive at least one token embedded within the program. Responsive to receiving the token, a prompt is presented on the display for a viewer to acknowledge the token. The processor receives a viewer acknowledgement of the token and sends the viewer acknowledgement to a program source. The AVDD receives back from the source in the channel in which the real time program was received augmented programming, and presents on the display the augmented programming in lieu of the real time broadcast program. Or, the augmented programming is combined with the real time broadcast program to establish a composite stream that is presented on the display. In any case, by virtue of returning an acknowledgement to the token carried in the real time broadcast program in the channel, a viewer's presence in a geographic area approved for augmented programming is assured.

In some embodiments the processor decodes the token to extract information therefrom. The token may instruct the processor to present the prompt immediately or in the future.

If desired, the token instructs the processor to collect a series of sub-tokens broadcast at periodic intervals in the broadcast TV program and return acknowledgements of each sub-token in a single return transmission to the source. In example embodiments, the acknowledgement sent to the source includes information decoded from the token. The token can be sent in an advertisement in the broadcast TV program. In this way, return of an acknowledgement to the prompt associated with the token indicates a viewer watched the advertisement.

In another aspect, a method includes providing audio video (AV) content on a channel associated with a geographic region and providing at least one enhanced content token in the AV content on the channel. The method also includes ensuring that distribution of enhanced content associated with the AV content is limited to the geographic region by sending the enhanced content in the channel only responsive to a determination that a predetermined viewer interaction associated with the token as occurred.

In another aspect, a source of television programming sends the TV programming into a first geographic region. The source has a processor and a transmitter configured for receiving TV programming signals from the processor and broadcasting the signals into the first geographic region. The processor also is configured for sending enhanced programming to the transmitter. The enhanced signals result in transforming 2D video in the TV programming signals into 3D signals and/or replacing 2D video in the TV programming signals with 3D video. The processor ties the enhanced programming to the TV programming signals to limit useful display of the enhanced programming to the first geographic region.

The details of the present invention, both as to its structure and operation, can be best understood in reference to the accompanying drawings, in which like reference numerals refer to like parts, and in which:

DETAILED DESCRIPTION OF THE PREFERRED EMBODIMENT

Figure 1:
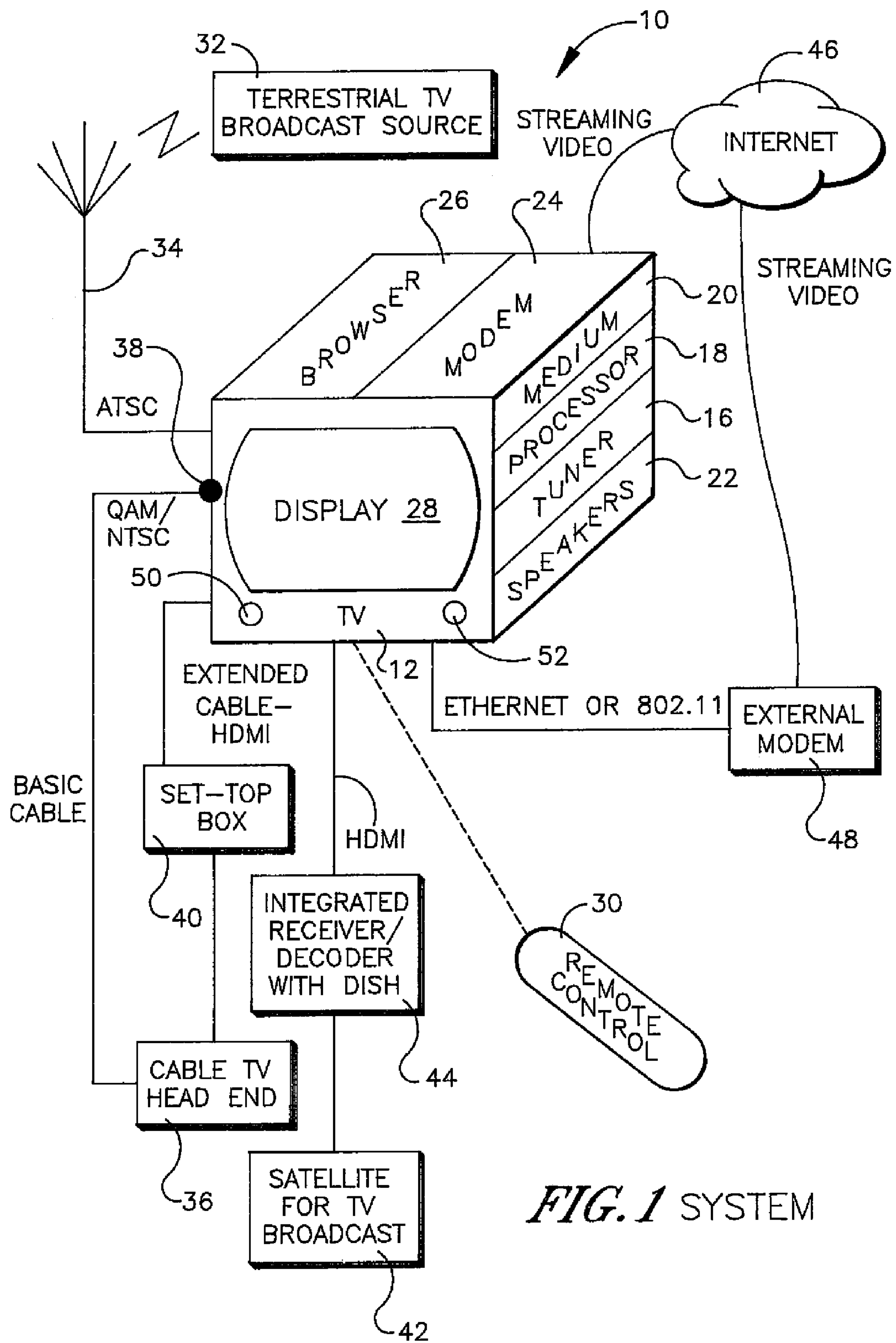
FIG. 1 is a block diagram of a non-limiting example system in accordance with present principles.

Referring initially to the non-limiting example embodiment shown in FIG. 1, a system 10 includes an audio video display device (AVDD) 12 such as a TV including a TV tuner 16 communicating with a TV processor 18 accessing a tangible computer readable storage medium 20 such as disk-based or solid state storage. The AVDD 12 can output audio on one or more speakers 22. The AVDD 12 can receive streaming video from the Internet using a built-in wired or wireless modem 24 communicating with the processor 12 which may execute a software-implemented browser 26. Video is presented under control of the TV processor 18 on a TV display 28 such as but not limited to a high definition TV (HDTV) flat panel display, and may be a touch screen display. The display 28 may be a 40" or larger display. User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the AVDD 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV. Other types of connections may be used, e.g., MOCA, USB, 1394 protocols, DLNA.

Similarly, HDMI baseband signals transmitted from a satellite source 42 of TV broadcast signals received by an integrated receiver/decoder (IRD) 44 associated with a home satellite dish may be input to the AVDD 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the AVDD 12 and conveyed to the AVDD 12 over a wired or wireless Ethernet link and received at an RJ45 or 802.11x antenna on the TV chassis. Note that both broadcast TV programs on a schedule can be sent through any of the channels above along with augmented content, either real time or non-real time (NRT) content, as described further below.

Also, in some embodiments a video camera 50, which may be integrated in the chassis if desired or mounted separately and electrically connected thereto, may be connected to the processor 16 to provide to the processor 16 video images of viewers looking at the display 28. The video camera 50 may be provided with a wide angle lens. The video camera 50 may have its own camera processor communicating with the TV processor 18, or it may be a simple imaging devices such as a CCD or other imager that is controlled by the processor 18. Furthermore, a microphone 52 may be provided on the chassis or separate therefrom and can be electrically connected to the processor 16 to provide viewer-generated voice commands to the processor 16.

Figure 2:
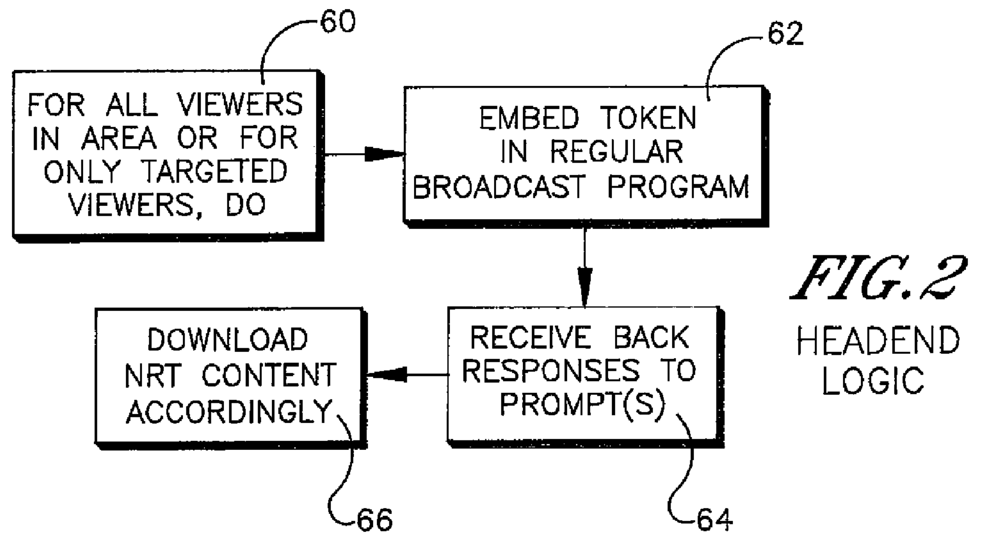
FIG. 2 is a flow chart of example TV signal source logic.

Now referring to the flow chart of example TV signal source logic in FIG. 2, the flow of logic begins for all viewers in an area or for only targeted viewers at block 60. In either case, a token may be embedded in the regular broadcast program at block 62. The tokens which are delivered within the OTA broadcast can be constructed such that the tokens themselves contain sufficient information when all the necessary tokens are received. They may then be decoded to provide the access to the NRT or associated broadband delivered content, such as a 3D version of the OTA broadcast, or other premium content. Note that while OTA broadcast is assumed to be a broadcast TV signal, in alternate embodiments it may be real time content broadcast or streamed over the Internet or other computer network.

The processor 18 may receive a response from the viewer to a prompt presented on the display 28 at block 64. The processor 18 may then download NRT content at block 66 according to the responses to the prompts received from the viewer.

Figure 3:
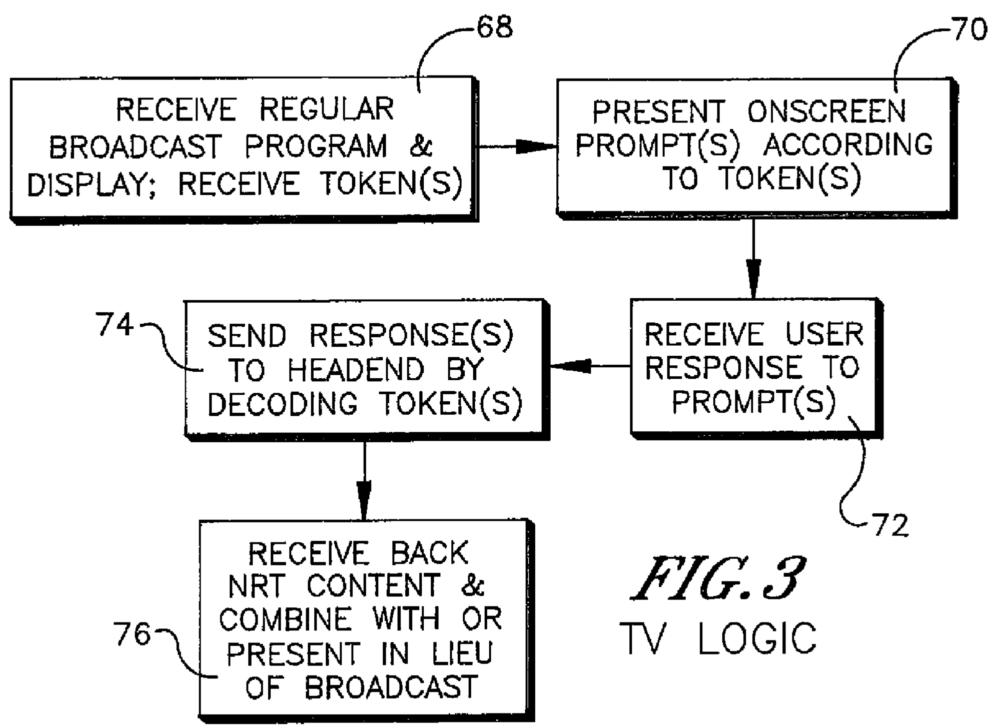
FIG. 3 is a flow chart of example TV logic.

Moving in reference to the flow chart of example TV logic shown in FIG. 3, the AVDD 12 can receive regular broad cast programming and display the content on the display 28 and speakers 22 while also receiving a token(s) at block 68. The processor 18 may present a prompt on the display 28 immediately according to the token(s) at block 70. The token may otherwise instruct the processor 18 to present the prompt in the future or may instruct the processor 18 to collect a series of sub-tokens broadcast at periodic intervals in the broadcast TV program and return acknowledgements of each sub-token in a single return transmission to the source. The acknowledgement sent to the source can include information decoded from the token. Note that instead of prompts induced by the tokens, the tokens may be decoded into numeric strings that are presented on the AVDD audibly or visually and that the user must reenter, e.g., using a RC, into the TV.

The processor 18 may receive a user's response to the prompt(s) at block 72 and send the response to the headend by decoding the token(s) at block 74. The processor 18 can receive back the NRT content and combine with or in lieu or the broadcast programming at block 76. The NRT can be combined with the broadcast programming to establish a composite stream that is presented on the display 28.

Figure 4:
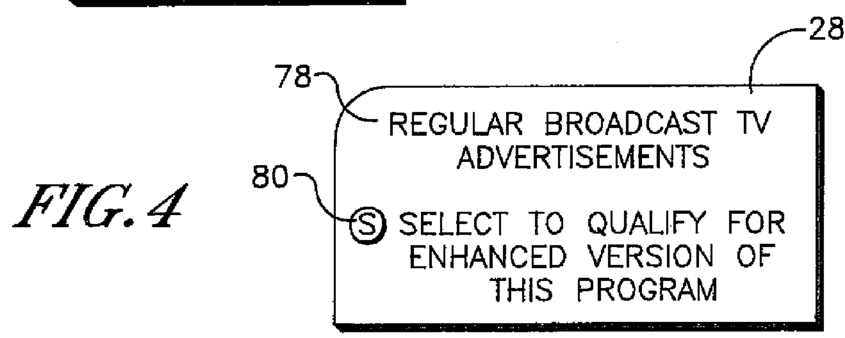
FIG. 4 is a screen shot showing an example prompt for augmented (NRT) content.

Now referring to the screen shot of FIG. 4, the token may be sent in an advertisement 78 in the broadcast TV program, whereby return of an acknowledgement to the prompt associated with the token indicates a viewer watched the advertisement. The regular broadcast TV advertisement 78 may be displayed on the display 28 along with a prompt 80 for the user to select to qualify for enhanced version of the current program.

It may now be appreciated that the tokens which are delivered within the over the air (OTA) broadcast are configured such that the tokens themselves contain sufficient information when all the necessary tokens are received. They are then decoded to provide the access to the NRT or associated broadband delivered content.

While the particular CONSTRAINING AVAILABILITY OF REAL TIME AND NON-REAL TIME CONTENT TO LOCALITY OF ASSOCIATED REAL TIME BROADCAST is herein shown and described in detail, it is to be understood that the subject matter which is encompassed by the present invention is limited only by the claims.

What is claimed is:

1. Audio video device (AVD) comprising:

processor configured for controlling a video display, the video display configured for presenting demanded images under control of the processor;

computer readable storage medium with instructions executable by the processor to:

receive a real time broadcast program in a channel;

receive at least a first token embedded within the program;

present a prompt on the display for a viewer to acknowledge the first token;

receive a viewer acknowledgement of the first token;

send the viewer acknowledgement to a program source;

in response to the viewer acknowledgement being received by the program source, receive back from the source in the channel in which the real time broadcast program was received augmented programming, the augmented programming including at least video content presentable on the video display; and present on the display the augmented programming in lieu of the real time broadcast program or combining the augmented programming with the real time broadcast program to establish a composite stream that is presented on the display, wherein the first token instructs the processor to collect a series of sub-tokens broadcast in a defined order at periodic intervals in the real time broadcast program, the processor configured with instructions to execute at least one of:

collecting the series of sub-tokens and return acknowledgements of each sub-token, the acknowledgements including information decoded from the sub-tokens; and/or decoding the tokens into numeric strings that are presented on the display and that the user must reenter to acknowledge.

2. The AVD of claim 1, wherein the processor is configured to decode the first token to extract information therefrom.

3. The AVD of claim 2, wherein the acknowledgement sent to the source includes information decoded from the first token.

4. The AVD of claim 1, wherein the real time AV content is broadcast TV content, and the augmented programming is AV content and does not include the first token.

5. The AVD of claim 1, wherein the real time AV content is Internet content.

6. The AVD of claim 1, wherein the first token is sent in an advertisement in the real time broadcast program, whereby return of an acknowledgement to the prompt associated with the first token indicates a viewer watched the advertisement.

7. Method comprising:

providing real time audio video (AV) content on a channel to a first device;

providing, to the first device while providing the real time AV content, plural enhanced content tokens in the AV content on the channel at periodic intervals;

ensuring that distribution of enhanced content associated with the AV content is only observable on the first device responsive to enough AV content having been provided to the first device to also provide at least first and second tokens separated by at least one periodic interval, wherein the ensuring includes providing the enhanced content in the channel to the first device responsive to receiving a transmission from the first device, wherein responsive to information in the first token the first device collects a series of sub-tokens broadcast in a defined order at periodic intervals in the real time AV content.

8. The method of claim 7, comprising responsive to receiving at least one token presenting a prompt on a video display of the first device for a viewer to acknowledge the token.

9. The method of claim 8, wherein the transmission is a viewer acknowledgement of the tokens that is sent to a program source, the method further comprising receiving back from the source in the channel in which the real time AV content was received augmented programming.

10. The method of claim 8, wherein at least one of the tokens instructs the processor to present the prompt in the future.

11. The method of claim 9, comprising presenting on the display the augmented programming in lieu of the real time AV content or combining the augmented programming with the real time AV content to establish a composite stream that is presented on the display, whereby by virtue of returning the acknowledgement, a viewer's presence in a geographic area approved for augmented programming is assured.

12. The method of claim 7, wherein the real time AV content is broadcast TV content.

13. The method of claim 7, wherein the real time AV content is Internet content.

14. The method of claim 7, comprising sending at least one token in an advertisement in the AV content, and wherein the transmission includes at least one piece of information from the token in the advertisement to indicate a viewer watched the advertisement.

15. The method of claim 7, wherein the information from each of the at least two tokens was provided by a user manipulating a remote control associated with the first device.

16. Source of real time programming sending real time audio video (AV) programming into a first geographic region, comprising:

processor;

transmitter configured for receiving AV programming signals from the processor and sending the signals into the first geographic region;

wherein the processor also is configured for sending enhanced programming signals of video content to the transmitter, the enhanced programming signals for replacing 2D video from the AV programming signals with 3D video, the processor configured for associating the enhanced programming signals with the AV programming signals to limit, on a device receiving both the AV programming signals and the enhanced programming signals, display of the 3D video on the device to the first geographic region, wherein the processor is configured to tie the enhanced programming signals to the AV programming signals at least in part using first and second tokens sent in the AV programming signals, wherein the first token instructs the device to collect a series of sub-tokens broadcast in a defined order at periodic intervals in the AV programming.

17. The source of claim 16, wherein the source is configured, responsive to receiving from a receiver a viewer acknowledgement of the token, to send the enhanced programming signals to the receiver.

18. The source of claim 16, wherein the processor is configured to cause the token to be sent in an advertisement in the AV programming signals, whereby return of an acknowledgement to a prompt associated with the token indicates a viewer watched the advertisement.

* * * * *